(12) United States Patent
Lamborne et al.

(10) Patent No.: US 12,244,455 B2
(45) Date of Patent: Mar. 4, 2025

(54) DETECTING NETWORK ANOMALIES BY CORRELATING MULTIPLE INFORMATION SOURCES

(71) Applicant: Royal Bank of Canada, Toronto (CA)

(72) Inventors: Bryce Lamborne, Sydney (AU); Marat Khandros, New York City, NY (US)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 18/338,083

(22) Filed: Jun. 20, 2023

(65) Prior Publication Data
US 2023/0412452 A1    Dec. 21, 2023

Related U.S. Application Data

(60) Provisional application No. 63/354,077, filed on Jun. 21, 2022.

(51) Int. Cl.
  *H04L 41/0654*    (2022.01)
  *G06F 40/205*    (2020.01)
  *H04L 43/0823*    (2022.01)

(52) U.S. Cl.
  CPC ...... *H04L 41/0654* (2013.01); *H04L 43/0823* (2013.01); *G06F 40/205* (2020.01)

(58) Field of Classification Search
  None
  See application file for complete search history.

(56) References Cited

U.S. PATENT DOCUMENTS

| | | | | |
|---|---|---|---|---|
| 9,400,735 B2 * | 7/2016 | Huang | ................ | G06F 11/3612 |
| 11,838,309 B1 * | 12/2023 | Martin | ................ | H04L 63/1425 |
| 2008/0271143 A1 * | 10/2008 | Stephens | ............. | H04L 63/1425 726/22 |
| 2011/0082926 A1 | 4/2011 | Triano et al. | | |
| 2019/0349395 A1 * | 11/2019 | Be'Ery | ................ | H04L 63/1458 |
| 2020/0045069 A1 * | 2/2020 | Nanda | ................ | H04L 63/1425 |

FOREIGN PATENT DOCUMENTS

WO    2017050621 A1    3/2017

\* cited by examiner

*Primary Examiner* — Younes Naji

(57) ABSTRACT

A method for detecting network anomalies comprises monitoring a network that provides public-facing application services and monitoring at least one external public Internet platform outside of the network to obtain volumetric problem report data about the application services. The external public Internet platform is nonspecific to the application services. Responsive to the volumetric problem report data from the external public Internet platform(s) exceeding a threshold, at least one internal network event logging tool is queried for alerts, and from the alerts, at least one anomaly associated with the volumetric problem report data is identified and an anomaly report about the at least one anomaly is generated. Responsive to generating the anomaly report, it may be determined whether the at least one anomaly has a known remediation, and if so, the known remediation may be initiated automatically. Network administrator(s) may also be automatically notified.

30 Claims, 7 Drawing Sheets

DETECTING NETWORK ANOMALIES BY CORRELATING MULTIPLE INFORMATION SOURCES

CROSS-REFERENCE TO RELATED APPLICATION

This application claims priority to U.S. provisional application No. 63/354,077 filed on Jun. 21, 2022 and which is hereby incorporated by reference.

TECHNICAL FIELD

The present disclosure relates to network monitoring, and more particularly to detection of anomalies within a network.

BACKGROUND

Internal monitoring of computer networks is well known, and a range of software and other tools are available for this purpose. For example, the Moogsoft® software offered by Moogsoft (Herd) Inc. having an address at 1160 Battery Street East, 1st Floor, San Francisco, CA 94111 can ingest and process network information and provide suitable notifications to the network administrator(s). Prometheus is an open source project that also provides for network monitoring and alerts.

Even with suitable deduplication, organization and curation, the number of alerts in a large network can be substantial, requiring significant time and attention from the network administrator(s). Moreover, some of the alerts may not represent a significant real problem, and there is a concomitant risk that alerts relating to impactful problems with mission critical applications may be overlooked in an avalanche of less relevant alerts. Where a computer network provides outwardly facing services to users, for example in online commerce applications such as banking, charity, retail and reservations, delays in identifying and correcting such problems can lead to frustration and loss of custom. Thus, network administrators may fail to respond to network anomalies that are having significant impacts on a network's users while busy attending to alerts relating to other, less relevant anomalies. In other words, "false positives" may distract the network administrator(s) from genuine problems, leading to delays in resolution.

SUMMARY

In one aspect, a method for detecting network anomalies comprises monitoring a network that provides public-facing application services, and monitoring at least one external public Internet platform outside of the network to obtain volumetric problem report data about the application services. The external public Internet platform(s) are nonspecific to the application services. Responsive to the volumetric problem report data from the external public Internet platform(s) exceeding a threshold, at least one internal network event logging tool is queried for alerts. At least one anomaly associated with the volumetric problem report data is identified from the alerts and, responsive to identifying the anomaly (or anomalies), an anomaly report about the anomaly (or anomalies) is generated.

In some embodiments, responsive to generating the anomaly report, the method determines whether the at least one anomaly has a known remediation, and, responsive to determining that the at least one anomaly has a known remediation, the method automatically initiates the known remediation.

In some embodiments, the method further comprises notifying at least one network administrator of the anomaly report.

The threshold may be a fixed threshold, a time-bounded threshold, or a rate.

The external public Internet platform(s) may comprise one or more dedicated problem-reporting platforms, one or more social media platforms, or one or more of both types of platform.

For one or more dedicated problem-reporting platforms, at least a portion of the volumetric problem report data may be provided directly by the problem-reporting platform(s), or at least a portion of the volumetric problem report data may be generated by analyzing reports posted by the problem-reporting platform(s), or both.

For one or more social media platforms, obtaining the volumetric problem report data may comprise extrapolating problem reports from public posts to the social media platform(s). The problem reports may be extrapolated by parsing the posts to identify keywords, or by parsing the posts to identify both keywords and images. After identifying the keywords, the problem reports may be disambiguated to exclude problem reports unrelated to the application services. In some embodiments, identifying the anomaly (or anomalies) from the alerts comprises mapping the identified keywords to corresponding application codes, using the application codes to identify at least one specific component of the application services, querying the internal network event logging tool(s) for alerts corresponding to the specific component(s), and using the alerts to identify the anomaly associated with the specific component(s). In one preferred embodiment, the anomaly report identifies the specific component(s). In some embodiments, mapping the identified keywords to corresponding application codes is done according to a correspondence table between keywords and application codes.

In another aspect, a computer program product comprises a tangible, non-transitory computer readable medium which, when executed by at least one processor of a computer, implements the method described above.

In a further aspect, a data processing system comprises at least one processor and memory coupled to the at least one processor, wherein the memory stores instructions which, when executed by the at least one processor, cause the at least one processor to implement the method described above.

BRIEF DESCRIPTION OF THE DRAWINGS

These and other features will become more apparent from the following description in which reference is made to the appended drawings wherein.

DETAILED DESCRIPTION

The present disclosure describes systems, methods and computer program products that leverage not only internal monitoring and alert platforms as sources of data, but also leverage crowdsourced data in addition to the data from internal monitoring and alert platforms, to thereby decrease the number of false positive alerts.

Figure 1:
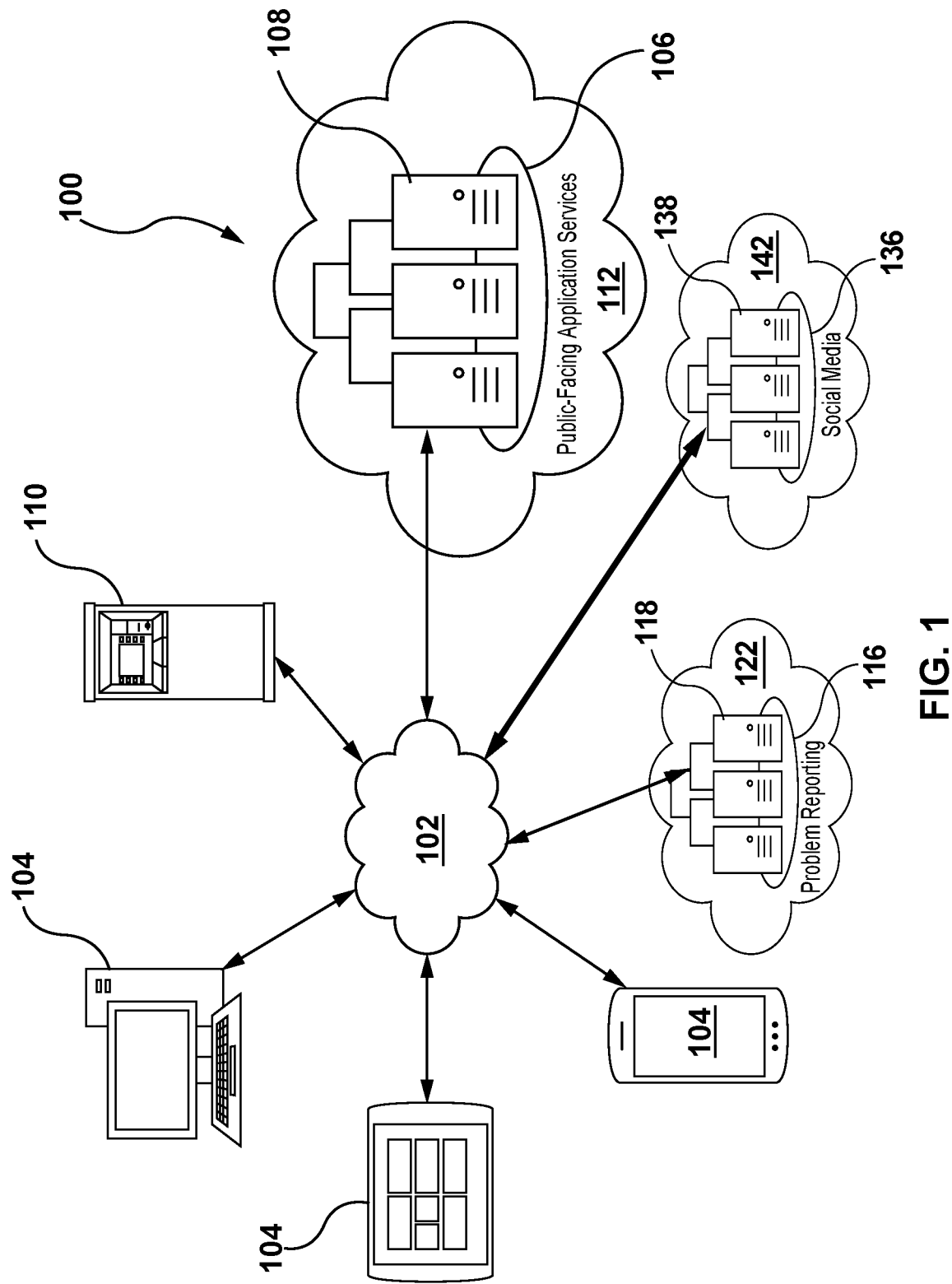
FIG. 1 shows an illustrative network of computer networks.

Referring now to FIG. 1, there is shown an overall computer network 100 that comprises an example embodiment of a system in respect of which methods for detecting network anomalies according to aspects of the present disclosure may be implemented. The overall computer network 100 is a network of smaller networks. More particularly, the overall computer network 100 comprises a wide area network 102 such as the Internet to which various user devices 104, an ATM 110, and a first data center 106 are communicatively coupled. The first data center 106 comprises a number of servers 108 networked together to form a first network 112 to collectively perform various computing functions; the first network 112 formed by the servers 108 of the first data center 106 is a component of the larger network 100, and provides public-facing application services. For example, in the context of a financial institution such as a bank, the first data center 106 may host online banking services that permit users to log in to those servers 108 using user accounts that give them access to various computer-implemented banking services, such as online fund transfers. Furthermore, individuals may appear in person at the ATM 110 to withdraw money from bank accounts controlled by the first data center 106. Additionally, the first data center 106 may provide dynamically scalable computing services to one or more internal users, such as investment bankers running various processes to assess risk and predict performance of financial instruments, and/or may provide cloud computing services to one or more external users. Other examples of public-facing application services include online retail services, travel services, communication services, among others. Although the first data center 106 is shown as a single cluster for simplicity of illustration, it is to be understood that there may be a plurality of communicatively coupled data centers, which may be distributed across a plurality of geographical locations, forming the first network 112.

One or more second data centers 116 comprise a number of servers 118 networked together to form a second network 122 which implements a dedicated problem-reporting platform, as described further below, which is coupled to the wide area network 102. One or more third data centers 136 comprise a number of servers 138 networked together to form a third network 142 which implements a social media platform. The social media platform is also coupled to the wide area network 102. Both the second network 122 which implements the dedicated problem-reporting platform and the third network 142 that implements the social media are external to the first network 112 that provides the public-facing application services, although they may be connected thereto by the wide area network 102.

Figure 2:
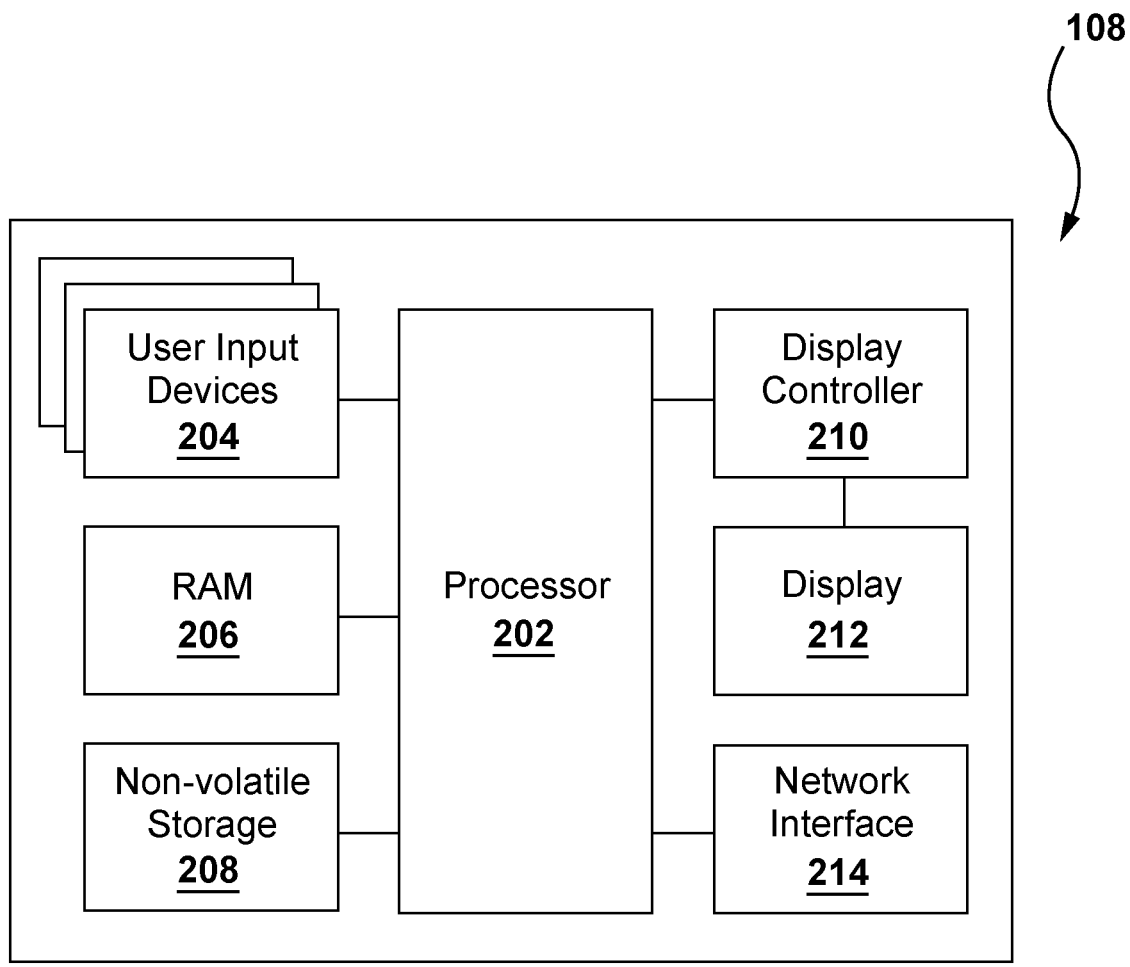
FIG. 2 shows a block diagram depicting an illustrative server computer.

Referring now to FIG. 2, there is depicted an example embodiment of one of the servers 108 that comprises the first data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code for execution at runtime by the processor 202; non-volatile storage 208, which stores the computer program code executed by the processor 202 in conjunction with the RAM 206 at runtime; a display controller 210, which is communicatively coupled to and controls a display 212; and a network interface 214, which facilitates network communications with the wide area network 102 and the other servers 108 in the first data center 106. The non-volatile storage 208 has stored on it computer program code that is loaded into the RAM 206 at runtime and that is executable by the processor 202. When the computer program code is executed by the processor 202, the processor 202 may cause the server 108 to implement a method for detecting network anomalies such as is described in more detail in respect of FIG. 3 below. Additionally or alternatively, the servers 108 may collectively perform that method using distributed computing. While the system depicted in FIG. 2 is described specifically in respect of one of the servers 108, analogous versions of the system may also be used for the user devices 104.

Figure 3:
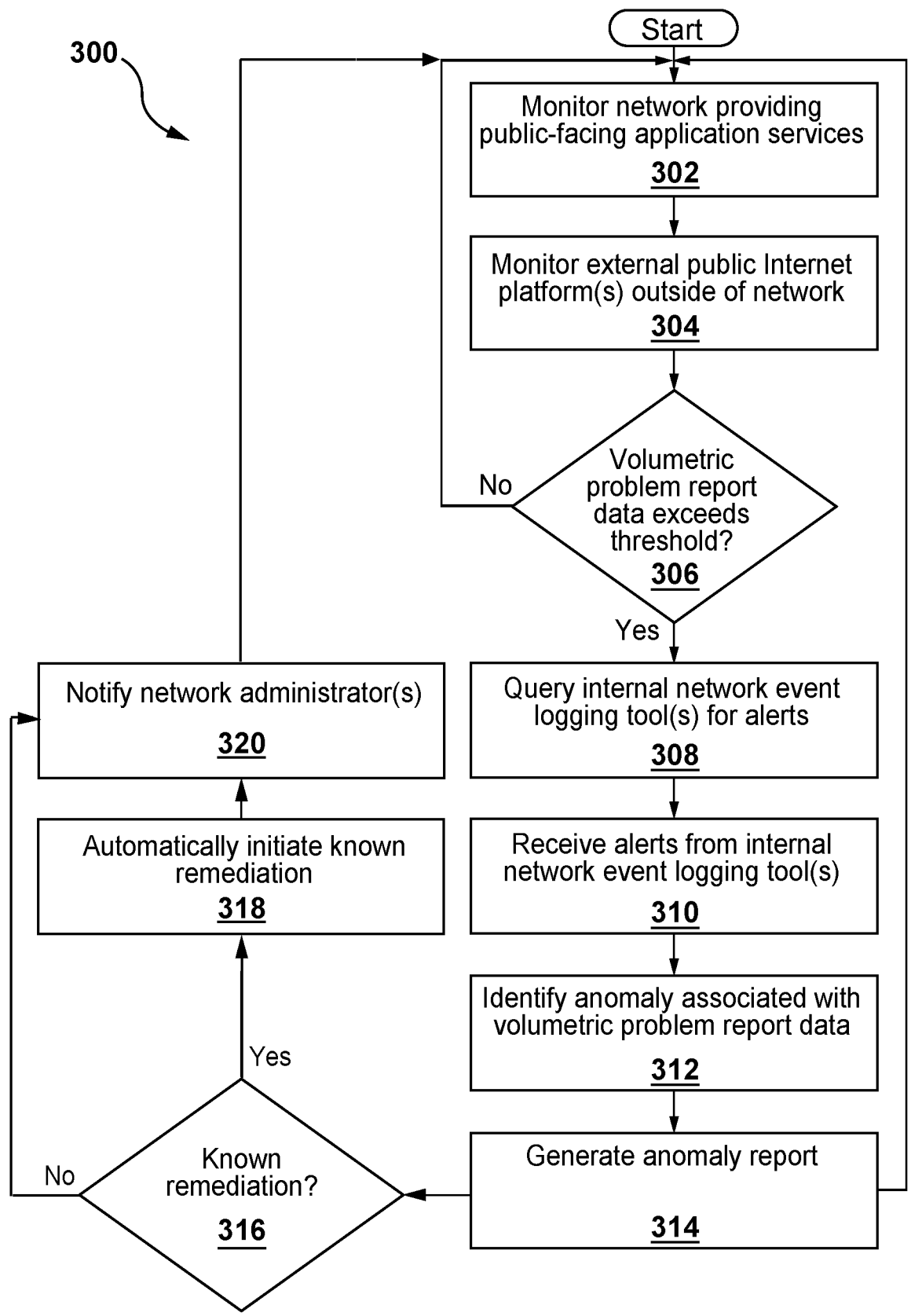
FIG. 3 is a flow chart showing a first illustrative method for detecting network anomalies.

Reference is now made to FIG. 3, which is a flow chart depicting a method 300 for detecting network anomalies. The method begins at step 302, where the method 300 monitors a network that provides public-facing application services. For example, the network monitored at step 302 may be the first network 112 formed by the servers 108 of the first data center 106 that host the public-facing application services (e.g. online banking services) although this is merely one example and is not limiting.

At step 304, the method 300 also monitors at least one external public Internet platform outside of the network (e.g. the dedicated problem-reporting platform implemented by the second network 122 and/or the social media platform implemented by the third network 142) to obtain volumetric problem report data about the application services provided by the network. The term "volumetric problem report data" refers to data comprising or derived from problem reports about the application services which conveys information about the volume of those problem reports. It may be an aggregate number of problem reports, with or without weighting and/or other formulaic calculations, and may take other factors into account, such as a geographic origin of the report.

Of note, the external public Internet platform(s) monitored at step 304 are nonspecific to the application services. The term "external" as used in this context means that the public Internet platform is not hosted by the network in which anomalies are to be detected (e.g. the network monitored at step 302, for example the first network 112) and are therefore outside of that network, even if connected thereto by intermediate networks. The term "nonspecific to the application services" means that the public Internet platform is adapted to receive information and feedback about topics beyond the application services and the entity providing them. Thus, a public Internet platform that is dedicated to receiving problem reports solely related to the network in which anomalies are to be detected or the entity maintaining that network is not "nonspecific to the application services", even if hosted by a different network than the network in which anomalies are to be detected. For example, a complaint submission platform or customer service/technical support request platform maintained by a retailer, a bank or other service provider in respect of its own products and/or services is not "nonspecific to the application services" hosted by that service provider. However, a complaint submission platform which allows submission of complaints about online retailers generally, or about banks generally, would be "nonspecific to the application services".

One example of a suitable external public Internet platform is a dedicated problem-reporting platform, e.g. the dedicated problem-reporting platform implemented by the second network 122. A dedicated problem-reporting platform is an Internet platform that allows users of a range of public-facing application services, such as social media, Internet service, online commerce, online banking, and the like, to check the status (e.g. availability) of those public-facing application services and/or submit complaints or problem reports. A dedicated problem-reporting platform may directly monitor the public-facing application services to determine their status, or may aggregate complaints and reports to infer the status, or both, and may present public information about the availability (or lack thereof) of the public-facing application services. One example of a dedicated problem-reporting platform is the Downdetector® platform offered by Ookla, LLC having an address at 1524 $5^{TH}$ Avenue, Suite 300, Seattle WA 98101. The Downdetector platform includes an application programming interface (API) to facilitate integration with internal network monitoring tools, enabling the method 300 to gather volumetric problem report data about the application services directly from the Downdetector platform. Thus, in some embodiments, at least a portion of the volumetric problem report data may be provided directly by the problem-reporting platform. Alternatively, subject to compliance with copyright and other laws and any applicable terms of service, the volumetric problem report data may be obtained by crawling or otherwise analyzing public web pages posted by the dedicated problem-reporting platform. Thus, in some embodiments, at least a portion of the volumetric problem report data may be generated by analyzing reports posted by the problem-reporting platform. Other examples of dedicated problem-reporting platforms include those hosted (as at the time of filing) at the URLs isitdownrightnow.com and downforeveryoneorjustme.com. These are merely examples and are not intended to be limiting.

Another example of an external public Internet platform is a social media platform, e.g. the social media platform implemented by the third network 142. Well-known social media platforms include the Twitter® platform operated by Twitter, Inc. having an address at 1355 Market Street, Suite 900 San Francisco CA 94103 and the Facebook® platform operated by Meta Platforms, Inc. having an address at 1601 Willow Road, Menlo Park, CA 94025. These are merely examples of social media platforms and are not intended to be limiting.

In some particular embodiments, volumetric problem report data from one or more social media platforms may be gathered by a dedicated problem-reporting platform so that volumetric problem report data from the social media platform(s) is obtained indirectly via a dedicated problem-reporting platform while volumetric problem report data from the dedicated problem-reporting platform is obtained directly therefrom.

In other embodiments, volumetric problem report data from social media platforms may be obtained by extrapolating problem reports from public posts to the social media platform(s). In some particular embodiments, the public posts, or aggregated data relating to the public posts, may be obtained by integration with an API provided by the social media platform(s). For example, the Twitter API enables queries based on keywords; by using a query that contains appropriate keywords to sufficiently identify the application services and capture complaints that the application service is not operating correctly, relevant Twitter posts can be gathered. In other particular embodiments, the public web pages of the social media platform(s) may be crawled otherwise analyzed, of course subject to compliance with copyright and other law and any applicable terms of service. For example, the problem reports may be extrapolated by parsing the posts to identify keywords, or by parsing the posts to identify both keywords and images, such as a company trademark or other indicia, or facsimiles or bastardizations thereof. In this latter embodiment, an image classifier may be used to identify relevant images. Keywords may be, for example, the name or nickname of a company, as well as words indicative of problems with the application services, for example (but not limited to) "down", "offline", "slow", and "broken". Nicknames may include derogatory nicknames, as the same may reasonably be expected in a complaint. For example, where the public-facing application services are airline reservation services for an airline called "Air[NAME]", keywords may include not only the actual name "Air[NAME]" but also the derisive nickname "Err [NAME]". Similar types of keywords may be used for API queries. In addition to simple keyword identification, artificial intelligence approaches may be used to analyze the posts. For example, a trained machine learning classifier could be used to identify posts that indicate a problem with the particular application services. An untrained classifier engine could be trained with social media posts annotated with information about the application services to which the posts relate, then tuned and tested. Natural language processing and/or semantic parsing may also be used.

In one preferred embodiment, after identifying the keywords (and optionally images), the problem reports are disambiguated to exclude problem reports unrelated to the application services. For example, where the application services are for online retail, a problem report relating to the quality of a purchased item should be excluded, because such a problem report is not related to the online retail application services supported by the network but to the underlying retail business. Similarly, where the application services are for online banking, problem reports relating to interest rates or service charges should be excluded as relating to the underlying banking business rather than to the online banking application services supported by the network (e.g. the first network 112 formed by the first data center 106). Disambiguation may be performed, for example, by use of additional keywords, or by way of semantic parsing to extract conceptual meaning, or by a trained machine learning classifier.

As noted above, the volumetric problem report data may be weighted; in some embodiments, problem report data from a dedicated problem-reporting platform may be weighted differently from problem report data from a social media platform, or the problem report data from different social media platforms may be weighted differently. These are merely illustrative, non-limiting examples of weighting.

At step 306, the method 300 checks whether the volumetric problem report data from the external public Internet platform(s) exceeds a threshold. The threshold at step 306 may be, for example, a fixed threshold, a time-bounded threshold, or a rate. The threshold will be based on how the volumetric problem report data is represented. For example, if the volumetric problem report data is simply the number of problem reports, the threshold may simply be a whole number. Where more complicated calculations are used to obtain the volumetric problem report data, the threshold may be suitably adapted to those calculations. A fixed threshold may be an absolute value, independent of the amount of time required to reach that value. For example, in some contexts it may be desirable to investigate the status of the network after a certain number of problem reports have been received, regardless of the time required for those problem reports to accrue. A time-bounded threshold may be a number of problem reports or similar value coupled with a period of time, for example X or more problem reports within Y minutes. A rate threshold may be used to measure increases in volumetric problem report data (e.g. whether the number of problem reports per minute or per hour is increasing); a sufficiently sharp increase in the number of problem reports may warrant investigation of the network. For example, where volumetric problem report data is obtained from a social media platform, the threshold may be at least partially based on standard volumes of particular keywords and set so as to identify notable adverse changes in trends. Thresholds may also be dynamic, and may vary based on time of day, or may be adapted using suitably trained artificial intelligence, for example using regression applied to a median or mean value. Rather than a static or variable threshold, dynamic anomaly detection may also be used (e.g. detecting spikes relative to a moving average). Thresholds that are specific to a particular social media network may also be used. For example, in the context of the Twitter social media platform, if a tweet from the entity maintaining the network is "ratioed" (replies to the tweet significantly outnumber "likes" or "retweets"), this may in some contexts warrant investigation of the network.

If the volumetric problem report data does not exceed the threshold ("no" at step 306), the method 300 continues to monitor the network (step 302) and the external public Internet platform(s) (step 204). However, responsive to the volumetric problem report data from the external public Internet platform(s) exceeding the threshold ("yes" at step 306), the method 300 proceeds to step 308.

At step 308, the method queries at least one internal network event logging tool for alerts. The internal network event logging tool logs events from the monitoring of the network at step 302. The internal network event logging tool(s) may be, or include, for example, a Moogsoft implementation and/or a Prometheus implementation, among others. The network event logging tool(s) are internal to network that provides the public-facing application services; that is, the network in which anomalies are to be detected (e.g. the network monitored at step 302).

At step 310, the method 300 receives the alerts from the internal network event logging tool(s) and then at step 312 the method 300 identifies, from the alerts, at least one anomaly associated with the volumetric problem report data. In some embodiments in which at least some of the volumetric problem report data is obtained from one or more social media platforms, the identified keywords can be used in support of identification of the anomaly (or anomalies). For example, the identified keywords may be mapped to corresponding application codes, and the application codes can then be used to identify at least one specific component of the application services. The internal network event logging tool(s) can then be queried for alerts corresponding to the specific component(s), and those alerts can then be used to identify the anomaly (or anomalies) associated with the specific component(s). In one embodiment, mapping of the identified keywords to corresponding application codes may be done according to a correspondence table between keywords and application codes; more sophisticated mappings are also contemplated, for example combinations of keywords may be mapped to application codes. In one such example, keyword "X" appearing in combination with keyword "Y" maps to application code "1" but keyword "X" appearing in combination with keyword "Z" maps to application code "2" which is different from application code "1". In another embodiment, artificial intelligence approaches may be used for mapping social media posts or other data element directly to corresponding application codes; for example a trained machine learning classifier may categorize a social media post or other data element as relating to a particular application code. An untrained classifier engine could be trained with a training set comprising social media posts and/or other data elements, each annotated with the particular application code to which the posts relate, then tuned and tested. Multiple artificial intelligence approaches may be combined.

As a further alternative, in another embodiment a dedicated problem-reporting platform may implement sufficiently granular reporting to enable the category of complaint to map to the application code. For example, instead of "online banking" as a single category, there may be individual categories (for example) of "fund transfer", "credit card", "direct deposit", "online negotiable instrument deposit", and so on. More generally, a dedicated problem-reporting platform may have, for a particular online service, categories for specific aspects such as "login", "messaging", "upload", "download", "purchase" or other features, rather than a single generic category for the online service. More broadly, a dedicated problem-reporting platform may enable reporting for specific categories (or subcategories) that map to a specific application code, rather than a single category that encompasses all aspects of the service. Of note, even where a dedicated problem-reporting platform implements such specific categories as part of a commercial arrangement with the entity whose network is being monitored, it remains an external public Internet platform since it is not hosted by that network. Further, where a dedicated problem-reporting platform implements such specific categories as part of a commercial arrangement as described above, so long as the dedicated problem-reporting platform remains adapted to receive information and feedback about topics beyond the application services and the entity providing them, it remains "nonspecific to the application services".

At step 314, responsive to identifying the anomaly (or anomalies), the method 300 generates an anomaly report about the anomaly (or anomalies). Preferably, the anomaly report identifies the specific component(s) with which the anomaly is associated. Of note, at step 314 the anomaly report remains internal to the system executing the method 300, and has not yet been provided to network administrators.

At optional step 316, responsive to generating the anomaly report, the method 300 may determine from the anomaly report whether the anomaly (or anomalies) detailed therein has a known remediation. Responsive to determining that there is a known remediation ("yes" at step 316), at step 318 the method automatically initiates the known remediation. Some non-limiting examples of this are discussed further below.

After automatic remediation is initiated at step 318, or if there is no known remediation ("no" at step 316), or if optional steps 316 and 318 are omitted, the method 300 proceeds to step 320 where the network administrator(s) will be notified of the anomaly report generated at step 314. For example, the anomaly report may be communicated directly to the network administrator(s) so that the anomaly report subsumes the notification, or the network administrator(s) may be notified and may then log in to access the anomaly report. Equivalently, step 320 may be carried out before optional steps 316 and 318, or after step 316 and before step 318. In the latter case, the anomaly report may identify the known remediation, and may provide the network administrator(s) with an opportunity to cancel or modify the remediation. After step 320, the method 300 may then return to step 302 and continue monitoring the network providing the public-facing application services (step 302) and monitoring the external public Internet platform(s) (step 304). Steps 302 and 304 may be performed in reverse order, and although shown sequentially for purposes of illustration, in practice steps 302 and 304 will typically be performed simultaneously.

Of note, while reports may be passed to network administrators from the internal network event logging tool(s) in other contexts as well, because steps 308 to 314 occur only if the threshold is exceeded at step 306, the anomaly report generated at step 314 can be given higher priority by network administrators. This is because it does not merely reflect internal monitoring of the network, but also external observation of a problem. Thus, an anomaly report generated at step 314 is of particularly high value to network administrators because it is corroborated—exceeding the threshold at step 306 means that the volumetric problem report data supports an inference that there is an incident of sufficient magnitude to have been noticed by external users. Moreover, because external users are affected, the anomaly report generated at step 314 also reflects the importance of the incident. Verification that the alert(s) from the network event logging tool(s) represent a real problem is effectively crowdsourced via monitoring of the external public Internet platform(s) at step 304.

Figure 4:
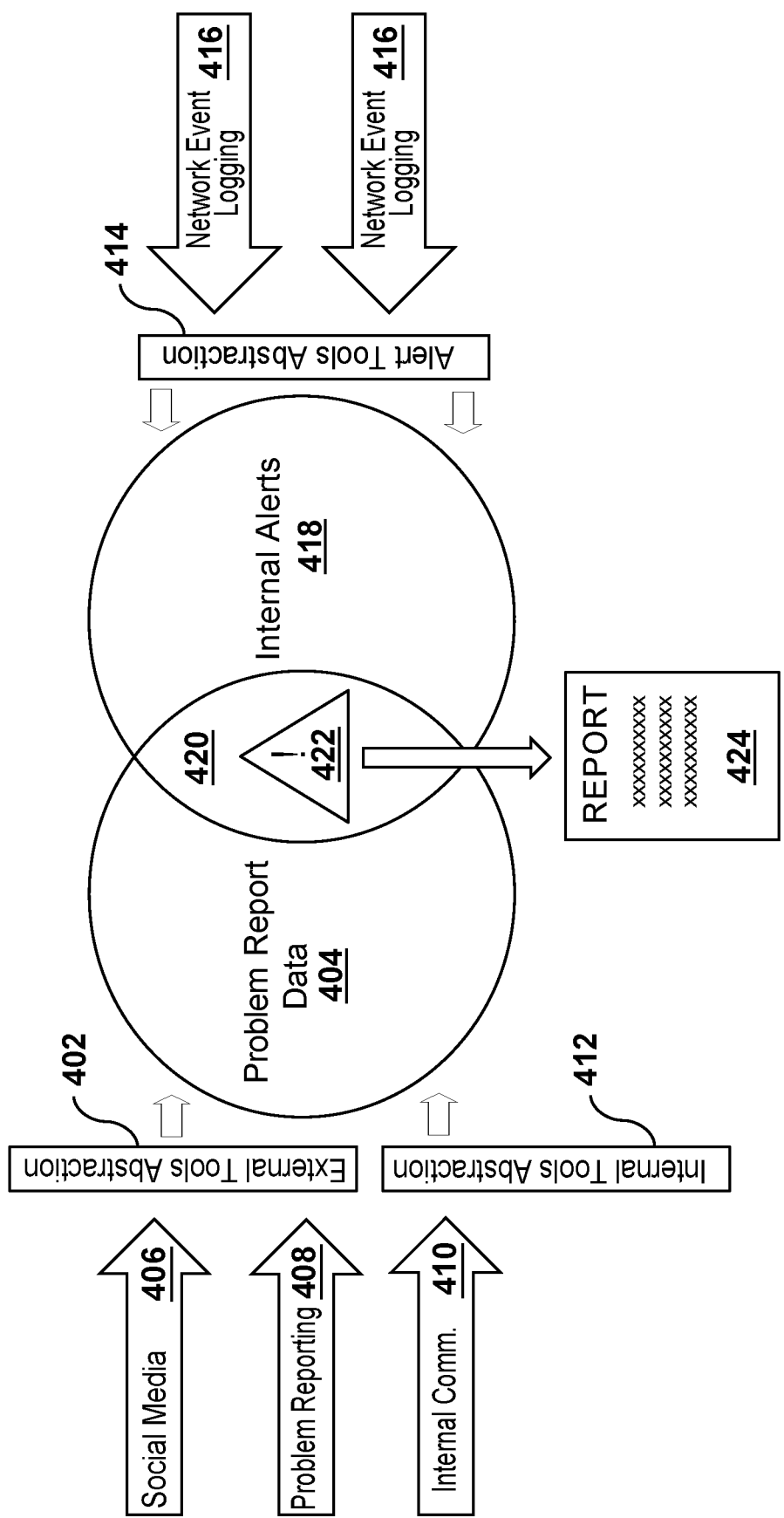
FIG. 4 schematically depicts an illustrative implementation of a method for detecting network anomalies.

Reference is now made to FIG. 4, which schematically depicts an illustrative implementation of the method 300 for detecting network anomalies.

On the left side of FIG. 4, an external tools abstraction layer 402 extracts volumetric problem report data 404 from external public Internet platform(s), including a social media platform 406 and a dedicated problem-reporting platform 408. Although only a single social media platform 406 and a single dedicated problem-reporting platform 408 are shown in FIG. 4, this is merely for purposes of illustration and there may be multiple social media platforms and/or multiple dedicated problem-reporting platforms. Optionally, some volumetric problem report data 404 may also be extracted from internal communication tools 410 by an internal tools abstraction layer 412. The Slack® messaging platform offered by Slack Technologies, Inc. having an address at 500 Howard Street, San Francisco, CA 94105, is one example of an internal communication tool although it is not the only example.

On the right side of FIG. 4, an alert tools abstraction layer 414 extracts alerts 418 from internal network event logging tools 416.

The abstraction layers 402, 412, 414 function as interfaces between the data sources and the system that implements the method 300, and may use polymorphism; the object layer that implements the given interface is forced to implement methods of given types and as such compatible modularization is achieved, and are extendable provided conformity to the interface is maintained. The transformation logic would be abstracted and encapsulated in the object transformed before returning to the system that implements the method 300. Thus, additional data sources can be made to be ingested by the system by adding or modifying an appropriate abstraction layer. Implementation of suitable abstraction layers, given knowledge of the particular external data sources and details of the system that implements the method 300, is within the capability of one of ordinary skill in the art, now informed by the present disclosure.

Where there is overlap 420 between the volumetric problem report data 404 and the internal alerts 418, indicating corroboration, one or more anomalies 422 associated with the volumetric problem report data 404 can be identified, and then an anomaly report 424 about the one or more anomalies 422 is generated. The anomaly report 424 may, for example, be communicated to an internal Slack channel, or to other communication channels, such as e-mail and pagers, for further action. As noted above, at optional step 316 the method 300 may analyze the anomaly report 424 to determine whether there is a known remediation and, if so, the method 300 may automatically initiate the known remediation at step 318. In one preferred embodiment, therefore, the anomaly report 424 may trigger an automated response to repair the network. For example, there may be a set of recurring anomalies or groups of anomalies for which the remediation is known and susceptible of automation; when the anomaly report 424 indicates such a recurrent anomaly the automated remediation may be initiated in response to the anomaly report 424 without human intervention. Of note, the term "known remediation" does not require a remediation that is guaranteed to correct the problem that has resulted in the anomaly or anomalies, but merely a remediation that has a reasonable likelihood (which may be less than a 50% likelihood) of doing so. In one embodiment, a known remediation may be a predefined sequence of one or more idempotent tasks that could be executed in attempts to fix a problem, such as when an above average number of reports are received from a given source and correlated to an internal alert where it is known that restarting certain network peripherals may remedy the issue. For example, where a particular pattern in the anomaly report 424 indicates that restarting or resetting a certain router in the network must is reasonably likely to restore proper function, the system implementing the method 300 may automatically restart or reset that router without human intervention, thereby performing an automated self-healing function in response to the anomaly report 424. More sophisticated automated pattern analysis and automated problem resolution is also contemplated. One example of a more sophisticated implementation would be self-supervised artificial intelligence configured to determine what actions would be appropriate, and then enact them in a given scenario, with remediation enabled via APIs and remote procedure calls (RPCs). For example, the anomaly report 424 may trigger a bespoke script, or cause an orchestrator to run a sequence of commands against infrastructure/systems where the script or sequence of commands will be idempotent. One suitable example of an orchestrator is the Ansible orchestrator offered by Red Hat, Inc. having an address at 100 E. Davie Street, Raleigh, NC 27601, USA (www.ansible.com).

Figure 5:
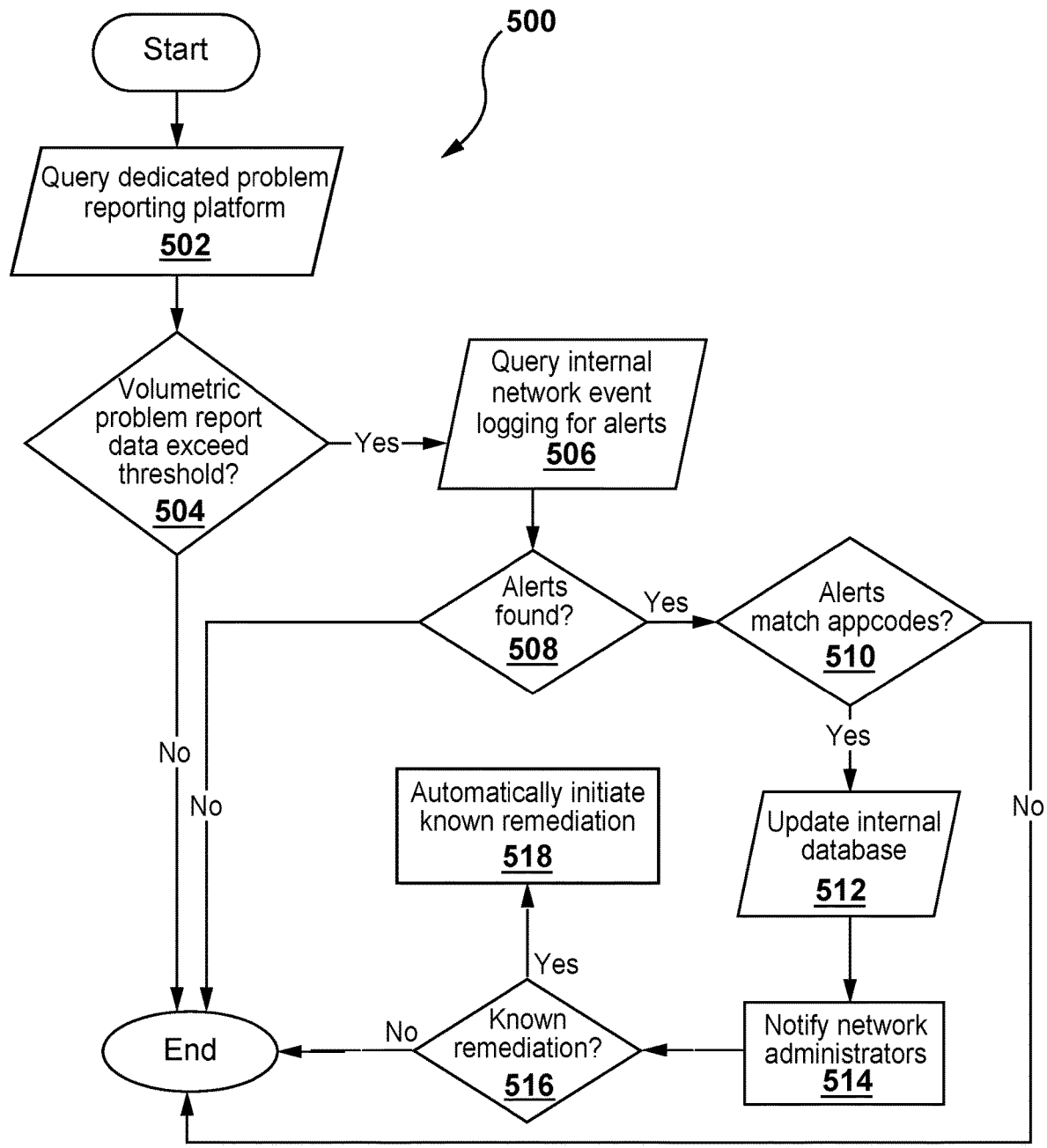
FIG. 5 is a flow chart showing a second illustrative method for detecting network anomalies.

With reference now to FIG. 5, another flow chart depicts another illustrative method 500 for detecting network anomalies. At step 502, the method queries a dedicated problem-reporting platform for volumetric problem report data, and at step 504, the method 500 checks whether the volumetric problem report data exceeds a threshold, which may be, for example, a fixed threshold, a time-bounded threshold, or a rate. If volumetric problem report data from one or more social media platforms is gathered by the dedicated problem-reporting platform, the volumetric problem report data from the social media platform(s) may also be returned in response to a similar query to the query at step 502. If the volumetric problem report data does not exceed the threshold ("no" at step 504), the method 500 ends. However, responsive to the volumetric problem report data from the dedicated problem-reporting platform exceeding the threshold ("yes" at step 504), the method 500 proceeds to step 506.

At step 506, the method 500 queries at least one internal network event logging tool for alerts, and at step 508, the method 500 checks whether any alerts were found. If no alerts were found ("no" at step 508), the method 500 ends. If alerts were found ("yes" at step 508), the method 500 proceeds to step 510.

At step 510, the method 500 tests whether the alerts found at step 508 match any application codes corresponding to the volumetric problem report data. (The term "appcode" is sometimes used herein as an abbreviation for "application code".) If not ("no" at step 510), the method 500 ends. If the alerts found at step 508 match application codes corresponding to the volumetric problem report data ("yes" at step 510), the method 500 proceeds to step 512.

At step 512, the method 500 updates an internal database to reflect the volumetric problem report data and the alerts, and optionally additional data. The method 500 then proceeds to step 514 to notify network administrators.

After step 514, at optional step 516, the method 300 may analyze the volumetric problem report data and the alerts, and optionally additional data, to determine whether there is a known remediation. Responsive to determining that there is a known remediation ("yes" at step 516), at step 518 the method 500 automatically initiates the known remediation, after which the method 500 ends. If there is no known remediation ("no" at step 516) the method 500 ends. Alternatively, if optional steps 516 and 518 are omitted, the method 500 may end after step 514. Equivalently, step 514 may be carried out after optional steps 516 and 518, or after step 516 and before step 518. In the latter case, the anomaly report may identify the known remediation, and provide an option to cancel it.

Figure 6:
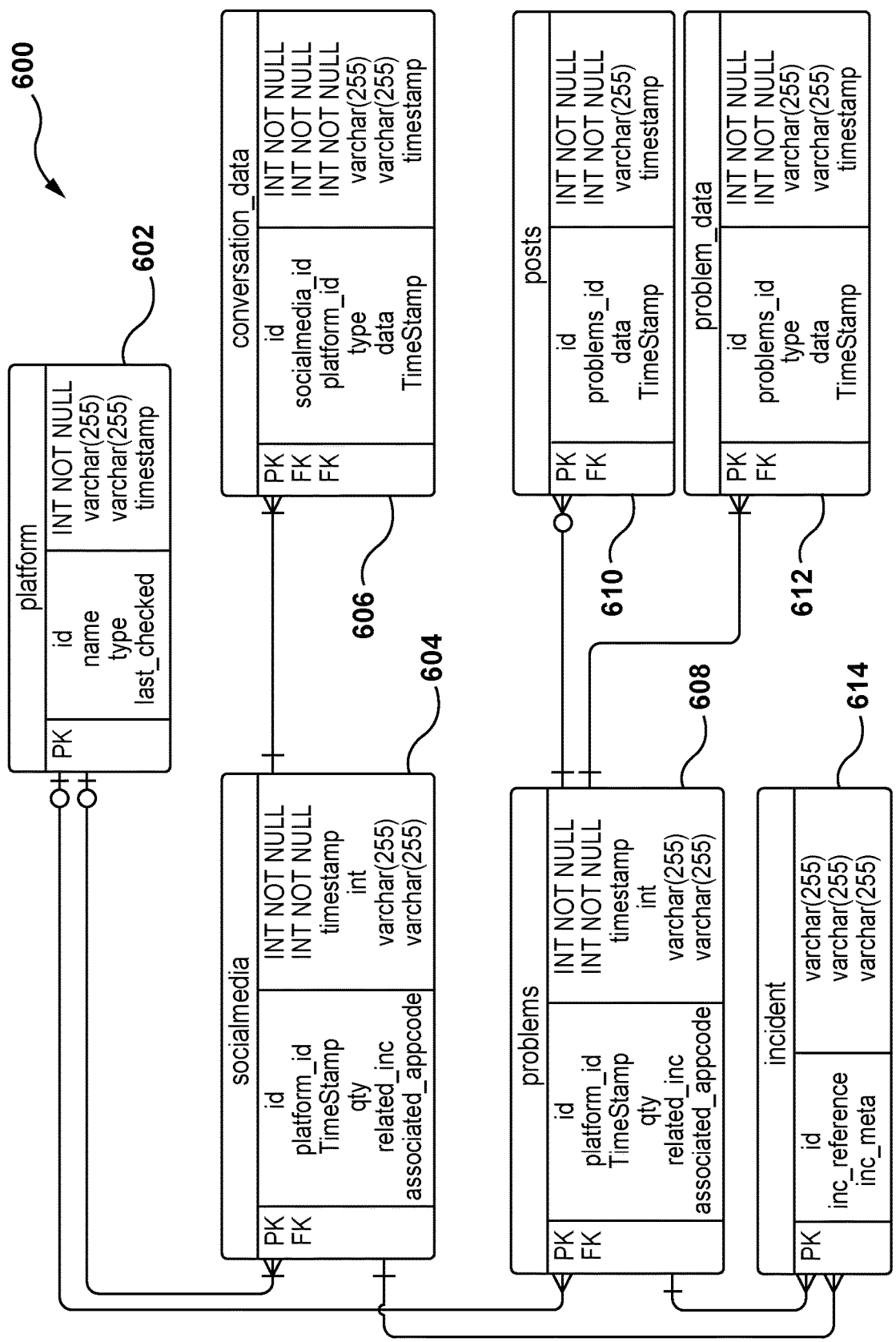
FIG. 6 shows an illustrative entity relationship diagram for an illustrative implementation of a system for detecting network anomalies.

FIG. 6 shows an illustrative entity relationship diagram 600 for an illustrative, non-limiting implementation of a system for detecting network anomalies according to aspects of the present disclosure.

In the illustrated embodiment, there is a platform entity 602, a social media entity 604, a conversation data entity 606, a problems entity 608, a posts entity 610, a problem data entity 612 and an incident entity 614. In FIG. 6, a primary key is denoted by "PK" and a foreign key is denoted by "FK".

The platform entity 602 is a table used for each external public Internet platform, and includes a unique identifier serving as a primary key, a name of the platform, a type of platform (social media platform or dedicated problem-reporting platform), and a "last checked" timestamp.

The social media entity 604 aggregates volumetric problem report data from social media platform(s), and has a unique identifier serving as a primary key, and an associated platform identifier serving as a foreign key (the platform entity 602 has a zero-or-one to many relationship with the social media entity 604). The social media entity 604 has a timestamp, a "qty" field for the quantity of reports, a "related_inc" field for a related internal incident reference, and a field for an associated application code. The social media entity 604 has a one to one-or-many relationship with the conversation data entity 606, which can provide more granular data.

The conversation data entity 606 is used for individual conversations or threads on social media, and has a unique identifier serving as a primary key, and a social media identifier and a platform identifier each serving as a foreign key. The conversation data entity 606 also has fields for an alert level ("type"), associated metadata ("data") and a timestamp.

The problems entity 608 is analogous to the social media entity 604 but for dedicated problem-reporting platforms, and also aggregates volumetric problem report data. The problems entity 608 similarly has a unique identifier as a primary key, a platform identifier as a foreign key, a timestamp, a "qty" field for the quantity of reports, a "related_inc" field for a related internal incident reference, and a field for an associated appcode. The problems entity 608 has a one to one-or-many relationship with the problem data entity 612, which provides more granular data about a problem reported by the dedicated problem-reporting platform and has a unique identifier serving as a primary key and a problem identifier serving as a foreign key. The problem data entity 612 also has fields for an alert level ("type"), associated metadata ("data") and a timestamp.

Optionally, a posts entity 610 may be provided, with the problem entity 608 having a one to zero-or-many relationship to the posts entity 610. The posts entity 610 may be used where one of the dedicated problem-reporting platforms gathers data from social media platforms or other public forums. For example, the Downdetector platform may fetch data from the Twitter social media platform. The posts entity 610 has a unique identifier serving as a primary key, a problem identifier serving as a foreign key, and fields for associated metadata ("data") and a timestamp.

The incident entity 614 is used to record incidents for which the volumetric problem report data from the external public Internet platform(s) exceeds the threshold(s), which incident can then be used to query the internal network event logging tool(s) for alerts to identify the anomaly or anomalies. The incident entity 614 has a unique identifier serving as a primary key, an "inc_reference" field for an internal incident reference and an "inc_meta" field for incident metadata. The social media entity 604 and the problems entity 608 each have a one to many relationship with the incident entity 614.

Figure 7:
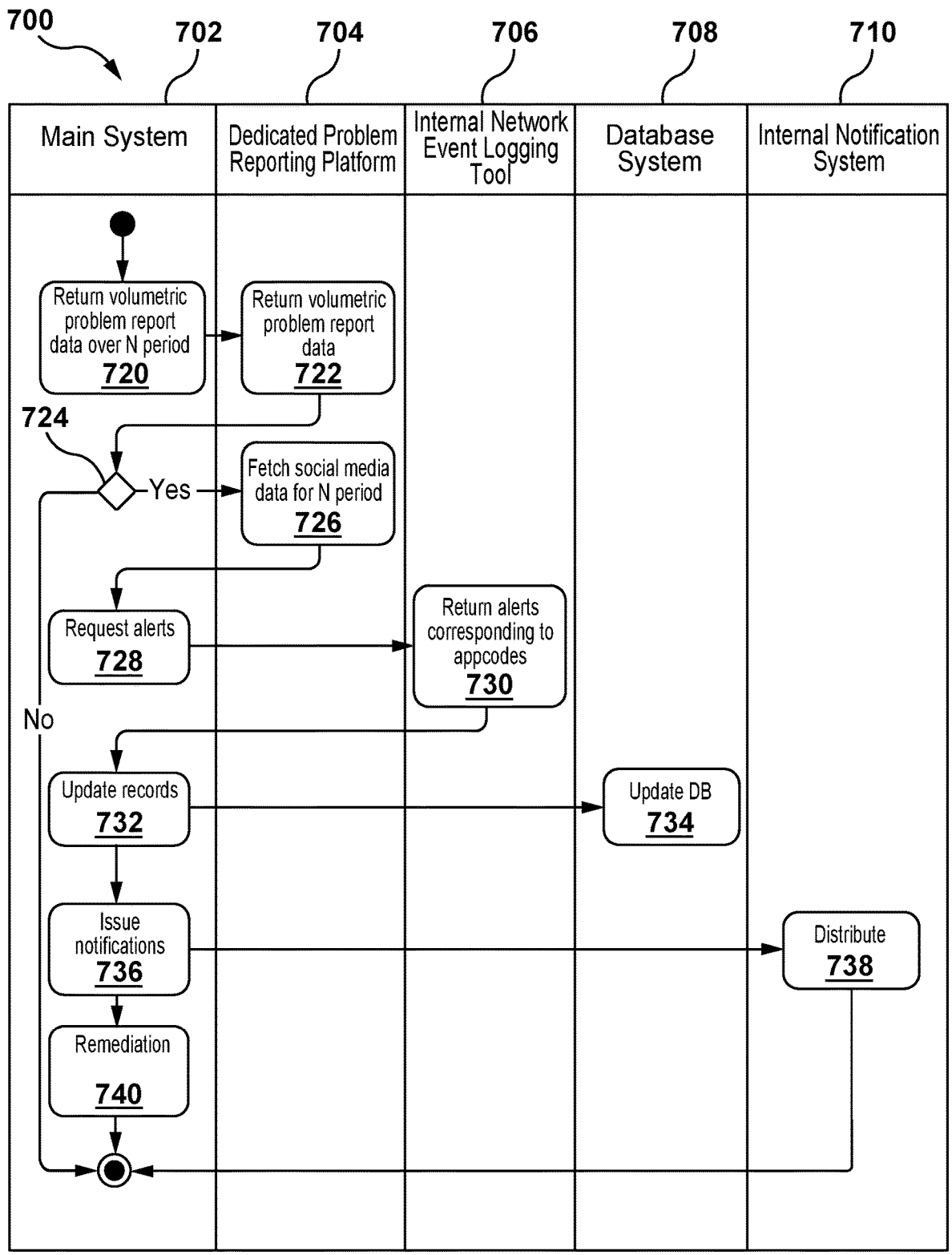
FIG. 7 is an illustrative activity diagram for a method for detecting network anomalies.

FIG. 7 is an illustrative, non-limiting activity diagram for a method 700 for detecting network anomalies according to aspects of the present disclosure. In FIG. 7, each vertical column denotes the system or subsystem which carries out a particular action. These are, from left to right, the main system 702, a dedicated problem-reporting platform 704, an internal network event logging tool 706, a database system 708, and an internal notification system 710 for network administrators. This is merely one illustrative implementation, and is not intended to be limiting. In the method 700 shown in FIG. 7, information from social media platforms is obtained only responsive to volumetric problem report data from one or more dedicated problem-reporting platform(s) exceeding a threshold. The information from the social media platform(s) is used to identify specific application codes for which alerts are to be requested. This is merely one illustrative, non-limiting implementation.

At step 720, the main system 702 requests volumetric problem report data for a given time period N from the dedicated problem-reporting platform 704, which returns the requested volumetric problem report data at step 722. At step 724, the main system 702 tests whether the returned volumetric problem report data exceeds a threshold. If not ("no" at step 724), the main system 702 ends the method 700. If the returned volumetric problem report data exceeds the threshold ("yes" at step 724), the main system 702 causes the dedicated problem-reporting platform 704 to fetch social media data for the time period N at step 726 (for example, the Downdetector platform may fetch data from the Twitter social media platform). Alternatively, the main system 702 may obtain the social media data directly from the social media platform. At step 728, the main system 702 requests alerts corresponding to application codes identified by the social media data, and at step 730 the internal network event logging tool 706 returns alerts corresponding to those application codes to the main system 702. The main system 702 then issues a record update request to the database system 708 at step 732, and at step 734 the database system 708 updates its records accordingly. Then, at step 736, the main system 702 issues notifications to the internal notification system 710, which distributes them at step 738 according to a pre-established protocol, such as one or more of a Slack channel and/or e-mail and/or pager and/or text/SMS notifications to network administrators. At optional step 740, the main system 702 may determine and initiate remediation as described above. Then, the method 700 ends. Step 740 may occur before either step 736 or step 738.

As can be seen from the above description, the network anomaly detection technology described herein represents significantly more than merely using categories to organize, store and transmit information and organizing information through mathematical correlations. The network anomaly detection technology is in fact an improvement to the technology of network management, as it provides the benefit of allowing internal alerts to be corroborated by external information indicating that users are affected. This facilitates the ability to elevate the importance of the anomaly report because it reflects one or more anomalies that are actually affecting external users, and in some cases initiate automatic remediation. Moreover, the network anomaly detection technology is confined to network management applications.

It can also be seen that the network anomaly detection technology is directed to the solution of a computer problem, that is, a problem with the operation of computer systems. Specifically, network administrators may fail to respond to network anomalies that are having significant impacts on a network's users while attending to alerts relating to other, less relevant anomalies (i.e. "false positives" may distract network administrators from genuine problems, leading to delays in resolution). By allowing anomalies/reports to be elevated in importance when corroborated by external user feedback, and in some cases remediated automatically, the present technology is directed toward obviating these computer problems.

The present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, other programmable data processing apparatus, or other devices to function in a particular manner, such that the instructions stored in the computer readable storage medium produce an article of manufacture including instructions which implement aspects of the functions/acts specified in the flowchart and/or block diagram block or blocks. The computer readable program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more currently preferred embodiments have been described by way of example. It will be apparent to persons skilled in the art that a number of variations and modifications can be made without departing from the scope of the claims. In construing the claims, it is to be understood that the use of a computer to implement the embodiments described herein is essential.

What is claimed is:

1. A computer-implemented method for detecting network anomalies, comprising:
   monitoring a network, wherein the network provides public-facing application services;
   monitoring at least one external public Internet platform outside of the network to obtain volumetric problem report data about the application services;
   wherein the at least one external public Internet platform is nonspecific to the application services;
   responsive to the volumetric problem report data from the at least one external public Internet platform exceeding a threshold, querying at least one internal network event logging tool for the network for alerts;
   identifying, from the alerts, at least one anomaly associated with the volumetric problem report data; and
   responsive to identifying the at least one anomaly, generating an anomaly report about the at least one anomaly;
   wherein the at least one external public Internet platform comprises at least one social media platform and obtaining the volumetric problem report data comprises extrapolating problem reports from public posts to the at least one social media platform;
   wherein the problem reports are extrapolated by parsing the public posts to identify keywords; and
   wherein identifying, from the alerts, the at least one anomaly associated with the volumetric problem report data comprises:
      mapping the identified keywords to corresponding application codes;
      using the application codes to identify at least one specific component of the application services;
      querying the at least one internal network event logging tool for alerts corresponding to the at least one specific component; and
      using the alerts corresponding to the at least one specific component to identify the at least one anomaly associated with the at least one specific component.

2. The method of claim 1, further comprising:
   responsive to generating the anomaly report, determining whether the at least one anomaly has a known remediation; and
   responsive to determining that the at least one anomaly has a known remediation, automatically initiating the known remediation.

3. The method of claim 1, further comprising notifying at least one network administrator of the anomaly report.

4. The method of claim 1, wherein the problem reports are extrapolated by further parsing the public posts to identify images.

5. The method of claim 1 further comprising, after identifying the keywords, disambiguating the problem reports to exclude problem reports unrelated to the application services.

6. The method of claim 1, wherein mapping the identified keywords to corresponding application codes is done according to a correspondence table between keywords and application codes.

7. The method of claim 1, wherein the anomaly report identifies the at least one specific component.

8. The method of claim 1, wherein the threshold is one of a fixed threshold, a time-bounded threshold, and a rate.

9. The method of claim 1, wherein the at least one external public Internet platform further comprises at least one dedicated problem-reporting platform and at least a portion of the volumetric problem report data is provided directly by the at least one dedicated problem-reporting platform.

10. The method of claim 1, wherein the at least one external public Internet platform further comprises at least one dedicated problem-reporting platform and at least a portion of the volumetric problem report data is generated by analyzing reports posted by the at least one dedicated problem-reporting platform.

11. A computer program product comprising a tangible, non-transitory computer readable medium which, when executed by at least one processor of a computer, causes the at least one processor to implement a method comprising:

monitoring a network, wherein the network provides public-facing application services;

monitoring at least one external public Internet platform outside of the network to obtain volumetric problem report data about the application services;

wherein the at least one external public Internet platform is nonspecific to the application services;

responsive to the volumetric problem report data from the at least one external public Internet platform exceeding a threshold, querying at least one internal network event logging tool for the network for alerts;

identifying, from the alerts, at least one anomaly associated with the volumetric problem report data; and responsive to identifying the at least one anomaly, generating an anomaly report about the at least one anomaly;

wherein the at least one external public Internet platform comprises at least one social media platform and obtaining the volumetric problem report data comprises extrapolating problem reports from public posts to the at least one social media platform;

wherein the problem reports are extrapolated by parsing the public posts to identify keywords; and wherein identifying, from the alerts, the at least one anomaly associated with the volumetric problem report data comprises:

mapping the identified keywords to corresponding application codes;

using the application codes to identify at least one specific component of the application services;

querying the at least one internal network event logging tool for alerts corresponding to the at least one specific component; and using the alerts corresponding to the at least one specific component to identify the at least one anomaly associated with the at least one specific component.

12. The computer program product of claim 11, wherein the method further comprises:

responsive to generating the anomaly report, determining whether the at least one anomaly has a known remediation; and responsive to determining that the at least one anomaly has a known remediation, automatically initiating the known remediation.

13. The computer program product of claim 11, wherein the method further comprises notifying at least one network administrator of the anomaly report.

14. The computer program product of claim 11, wherein the problem reports are extrapolated by further parsing the public posts to identify images.

15. The computer program product of claim 11, wherein the method further comprises, after identifying the keywords, disambiguating the problem reports to exclude problem reports unrelated to the application services.

16. The computer program product of claim 11, wherein mapping the identified keywords to corresponding application codes is done according to a correspondence table between keywords and application codes.

17. The computer program product of claim 11, wherein the anomaly report identifies the at least one specific component.

18. The computer program product of claim 11, wherein the threshold is one of a fixed threshold, a time-bounded threshold, and a rate.

19. The computer program product of claim 11, wherein the at least one external public Internet platform further comprises at least one dedicated problem-reporting platform and at least a portion of the volumetric problem report data is provided directly by the at least one dedicated problem-reporting platform.

20. The computer program product of claim 11, wherein the at least one external public Internet platform further comprises at least one dedicated problem-reporting platform and at least a portion of the volumetric problem report data is generated by analyzing reports posted by the at least one dedicated problem-reporting platform.

21. A data processing system comprising at least one processor and memory coupled to the at least one processor, wherein the memory stores instructions which, when executed by the at least one processor, cause the at least one processor to implement a method comprising:

monitoring a network, wherein the network provides public-facing application services;

monitoring at least one external public Internet platform outside of the network to obtain volumetric problem report data about the application services;

wherein the at least one external public Internet platform is nonspecific to the application services;

responsive to the volumetric problem report data from the at least one external public Internet platform exceeding a threshold, querying at least one internal network event logging tool for the network for alerts;

identifying, from the alerts, at least one anomaly associated with the volumetric problem report data; and responsive to identifying the at least one anomaly, generating an anomaly report about the at least one anomaly;

wherein the at least one external public Internet platform comprises at least one social media platform and obtaining the volumetric problem report data comprises extrapolating problem reports from public posts to the at least one social media platform;

wherein the problem reports are extrapolated by parsing the public posts to identify keywords; and wherein identifying, from the alerts, the at least one anomaly associated with the volumetric problem report data comprises:

mapping the identified keywords to corresponding application codes;

using the application codes to identify at least one specific component of the application services;

querying the at least one internal network event lopping tool for alerts corresponding to the at least one specific component; and using the alerts corresponding to the at least one specific component to identify the at least one anomaly associated with the at least one specific component.

22. The data processing system of claim 21, wherein the method further comprises:

responsive to generating the anomaly report, determining whether the at least one anomaly has a known remediation; and responsive to determining that the at least one anomaly has a known remediation, automatically initiating the known remediation.

23. The data processing system of claim 21, wherein the method further comprises notifying at least one network administrator of the anomaly report.

24. The data processing system of claim 21, wherein the problem reports are extrapolated by further parsing the public posts to identify images.

25. The data processing system of claim 21, wherein the method further comprises, after identifying the keywords, disambiguating the problem reports to exclude problem reports unrelated to the application services.

26. The data processing system of claim 21, wherein mapping the identified keywords to corresponding application codes is done according to a correspondence table between keywords and application codes.

27. The data processing system of claim 21, wherein the anomaly report identifies the at least one specific component.

28. The data processing system of claim 21, wherein the threshold is one of a fixed threshold, a time-bounded threshold, and a rate.

29. The data processing system of claim 21, wherein the at least one external public Internet platform further comprises at least one dedicated problem-reporting platform and at least a portion of the volumetric problem report data is provided directly by the at least one dedicated problem-reporting platform.

30. The data processing system of claim 21, wherein the at least one external public Internet platform further comprises at least one dedicated problem-reporting platform and at least a portion of the volumetric problem report data is generated by analyzing reports posted by the at least one dedicated problem-reporting platform.

\* \* \* \* \*